(12) United States Patent
Chen et al.

(10) Patent No.: US 7,891,658 B2
(45) Date of Patent: Feb. 22, 2011

(54) PAPER FEEDER HAVING A PAPER STOPPER AND OFFICE MACHINE USING THE SAME

(75) Inventors: Chih-Ming Chen, Taipei (TW); Yng-Shean Guo, Taipei (TW); Ming-Te Hung, Taipei (TW); Huai-Wen Hsu, Taipei (TW)

(73) Assignee: Qisda Corporation, Taoyuan County (TW)

( * ) Notice: Subject to any disclaimer, the term of this patent is extended or adjusted under 35 U.S.C. 154(b) by 127 days.

(21) Appl. No.: 12/430,124

(22) Filed: Apr. 27, 2009

(65) Prior Publication Data

US 2009/0273137 A1 Nov. 5, 2009

(30) Foreign Application Priority Data

May 1, 2008 (TW) ............................... 97116105 A

(51) Int. Cl.
*B65H 3/52* (2006.01)
*B65H 9/04* (2006.01)

(52) U.S. Cl. ..................... 271/121; 271/124; 271/245

(58) Field of Classification Search ................. 271/121, 271/122, 124, 167, 243–246
See application file for complete search history.

(56) References Cited

U.S. PATENT DOCUMENTS

| 6,764,072 | B2 * | 7/2004 | Gaarder ..................... 271/121 |
| 7,717,415 | B2 * | 5/2010 | Kim et al. .................... 271/110 |
| 2005/0263955 | A1 * | 12/2005 | Kim ............................ 271/121 |
| 2006/0049572 | A1 * | 3/2006 | Miyazawa .................... 271/121 |
| 2008/0143041 | A1 * | 6/2008 | Gladwin et al. ............. 271/122 |

FOREIGN PATENT DOCUMENTS

| JP | 05338865 | * 12/1993 |
| TW | 200408598 | 6/2004 |
| TW | M308949 | 4/2007 |

\* cited by examiner

*Primary Examiner*—Stefanos Karmis
*Assistant Examiner*—Patrick Cicchino

(57) ABSTRACT

A paper feeder disposed on a casing for feeding a paper is provided. The paper feeder includes a feeding axle and a paper stopper. The feeding axle has a first engaging portion. The paper stopper includes a blocking plate and a second engaging portion. The paper stopper is co-axially and rotatably disposed on the feeding axle. When the feeding axle rotates in a first direction to engage the second engaging portion with the first engaging portion, the feeding axle drives the paper stopper to rotate in the first direction until the blocking plate blocks the paper. When the feeding axle rotates in a second direction to detach the second engaging portion from the first engaging portion, the feeding axle is able to feed a paper.

20 Claims, 4 Drawing Sheets

PAPER FEEDER HAVING A PAPER STOPPER AND OFFICE MACHINE USING THE SAME

This application claims the benefit of Taiwan application Serial No. 97116105, filed May 1, 2008, the subject matter of which is incorporated herein by reference.

BACKGROUND OF THE INVENTION

1. Field of the Invention

The invention relates in general to a paper feeder and an office machine using the same, and more particularly to a paper feeder having a paper stopper and an office machine using the same.

2. Description of the Related Art

Most of the office machines such as printer, copier, scanner etc., are equipped with an automatic document feeder (ADF). The ADF is used for processing a piece of paper or document and driving the piece of paper or the document to enter the office machine one by one. Normally, the ADF drives the piece of paper or the document to enter the office machine through the friction generated during the rotation of the feed roller, and blocks other paper or document by the blocking plate to avoid the feeding problem such as multi-feed or misfeed.

A conventional ADF enables the blocking plate and the feed roller to work together through a linking mechanism. However, the linking mechanism is either too complicated or requires too many steps of operation, and is therefore susceptible to operation error and malfunction.

SUMMARY OF THE INVENTION

The invention is directed to a paper feeder having a paper stopper and an office machine using the same. The feeding axle and the paper stopper are connected through a simple mechanism, so that the movements of the feeding axle and the paper stopper are simplified and synchronized to reduce the likelihood of misfeed and ensure the reliability of the ADF under various operations.

According to a first aspect of the present invention, a paper feeder disposed on a casing for feeding a paper is provided. The paper feeder includes a feeding axle and a paper stopper. The feeding axle has a first engaging portion. The paper stopper includes a blocking plate and a second engaging portion. The paper stopper is co-axially and rotatably disposed on the feeding axle. When the feeding axle rotates in a first direction to engage the second engaging portion with the first engaging portion, the feeding axle drives the paper stopper to rotate in the first direction until the blocking plate blocks the paper. When the feeding axle rotates in a second direction to detach the second engaging portion from the first engaging portion, the feeding axle is able to feed a paper.

According to a second aspect of the present invention, an office machine for processing a paper is provided. The office machine includes a casing, a driving device and a paper feeder. The casing includes an upper cover, and the paper feeder is disposed on the casing. The paper feeder includes a feeding axle and a paper stopper. The feeding axle has a first engaging portion and a transmission portion, wherein the transmission portion is coupled with the driving device. The paper stopper includes a blocking plate and a second engaging portion, wherein the paper stopper is co-axially and rotatably disposed on the feeding axle. When the driving device drives the feeding axle rotates in a first direction to engage the second engaging portion with the first engaging portion, the feeding axle drives the paper stopper to rotate in the first direction until the blocking plate blocks the paper. When the driving device drives the feeding axle to rotate in a second direction to detach the second engaging portion from the first engaging portion, the feeding axle is able to feed a paper.

According to a third aspect of the present invention, a paper stopper disposed on a paper feeder is provided. The paper feeder includes a feeding axle for feeding a paper. The paper stopper includes a body, a blocking plate and a ratchet portion. The body is co-axially and rotatably disposed on the feeding axle. The blocking plate is protruded from the body, wherein the ratchet portion is located at one end of the body for engaging with one end of the feeding axle. When the feeding axle rotates in a first direction to engage the ratchet portion with the end of the feeding axle, the feeding axle drives the paper stopper to rotate in the first direction until the blocking plate blocks the paper. When the feeding axle rotates in a second direction to detach the ratchet portion from the end, the feeding axle is able to feed a paper.

The invention will become apparent from the following detailed description of the preferred but non-limiting embodiments. The following description is made with reference to the accompanying drawings.

DETAILED DESCRIPTION OF THE INVENTION

Figure 1:
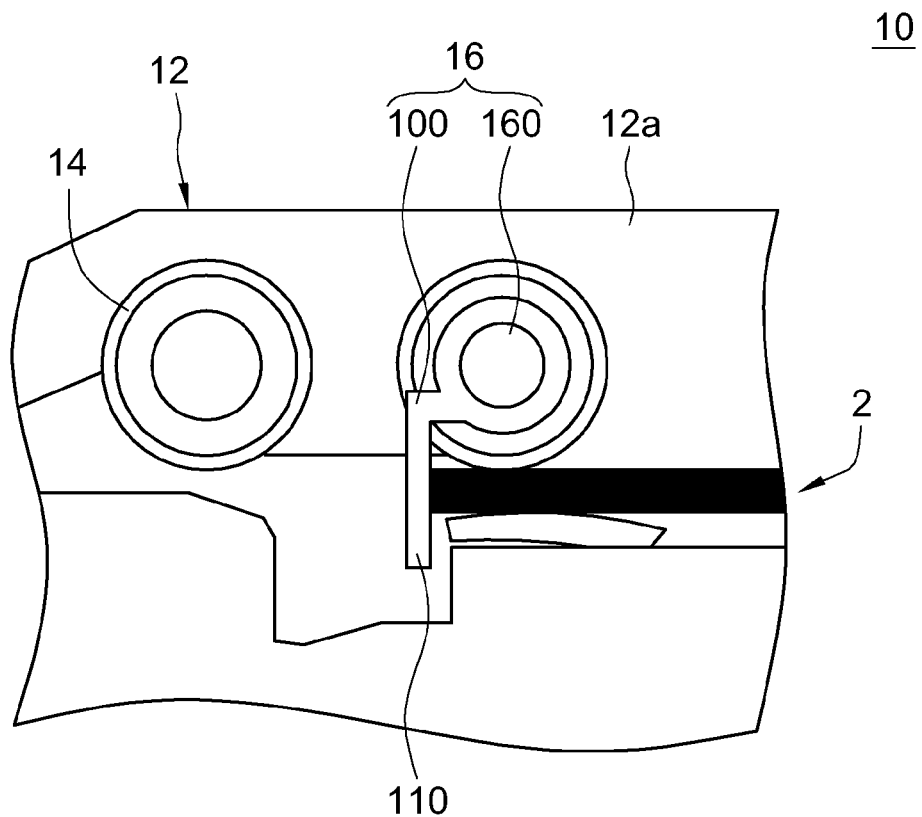
FIG. 1 shows a preferred embodiment of the invention applicable to an office machine.

Referring to FIG. 1, a preferred embodiment of the invention applicable to an office machine is shown. The office machine 10, such as copier, printer, scanner, and multi-function peripheral (MFP), is for processing different types of documents or paper. FIG. 1 shows a lateral cross-section of the office machine 10. The office machine 10 includes a casing 12, a driving device 14 and a paper feeder 16. The casing 12 includes an upper cover 12a, and the paper feeder 16 is disposed on the casing 12. The driving device 14, such as a transmission axle, transmits the power of a motor (not illustrated) to the paper feeder 16 through a gear set or a transmission belt. The paper feeder 16 includes a feeding axle 160 and a paper stopper 100, wherein the feeding axle 160 and the paper stopper 100 are co-axially and rotatably disposed and rotate synchronically. When the office machine 10 feeds a paper, the feeding axle 160 rotates in a feeding direction to move the paper 2 and lift the blocking plate 110 of the paper stopper 100 at the same time so that the paper 2 is able to enter the office machine 10. When the office machine 10 stops feeding paper, the feeding axle 160 rotates in the reverse direction and at the same time lowers the blocking plate 110 of the paper stopper 100 to block the paper entrance to avoid misfeed.

Figure 2A:
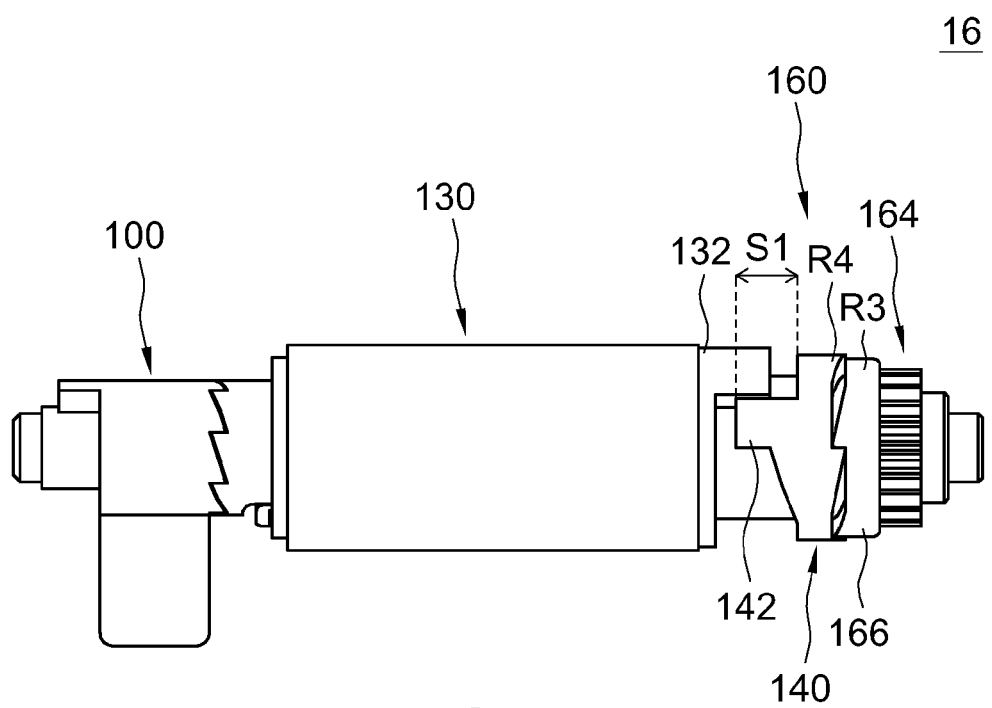
FIG. 2A shows an assembly diagram of the paper feeder according to a preferred embodiment of the invention.
Figure 2B:
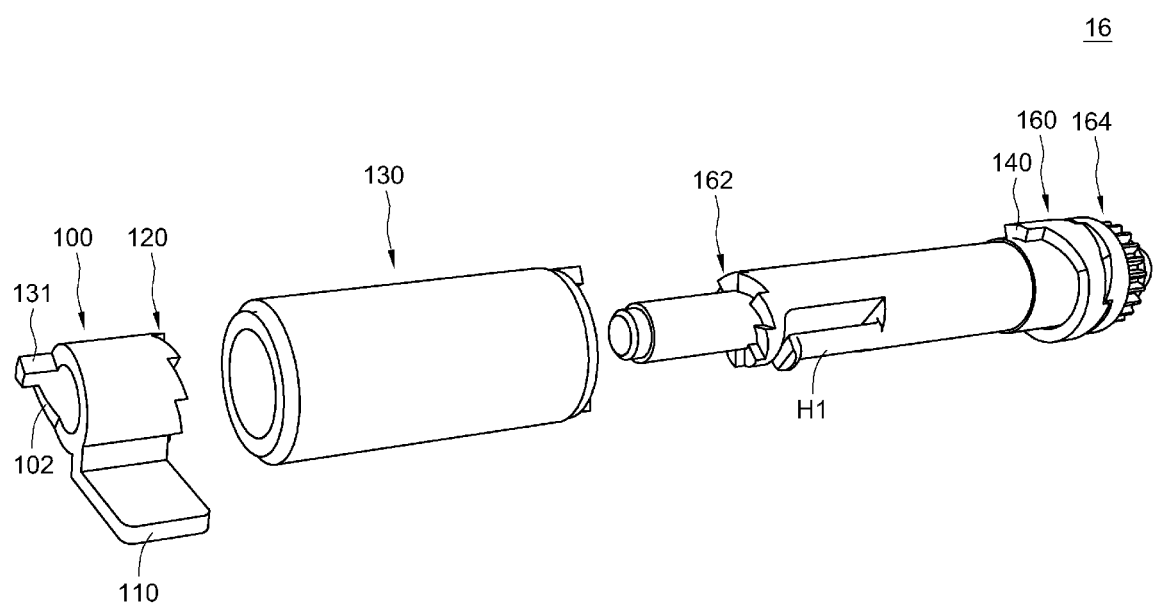
FIG. 2B shows an exploded diagram of the paper feeder according to a preferred embodiment of the invention.

Referring to both FIG. 2A and FIG. 2B, an assembly diagram and an exploded diagram of the paper feeder according to a preferred embodiment of the invention are respectively shown. The feeding axle 160 has an engaging portion 162 and a transmission portion 164, wherein the transmission portion 164 is coupled with the driving device 14 of FIG. 1 through the gear set or the transmission belt.

Figure 3A:
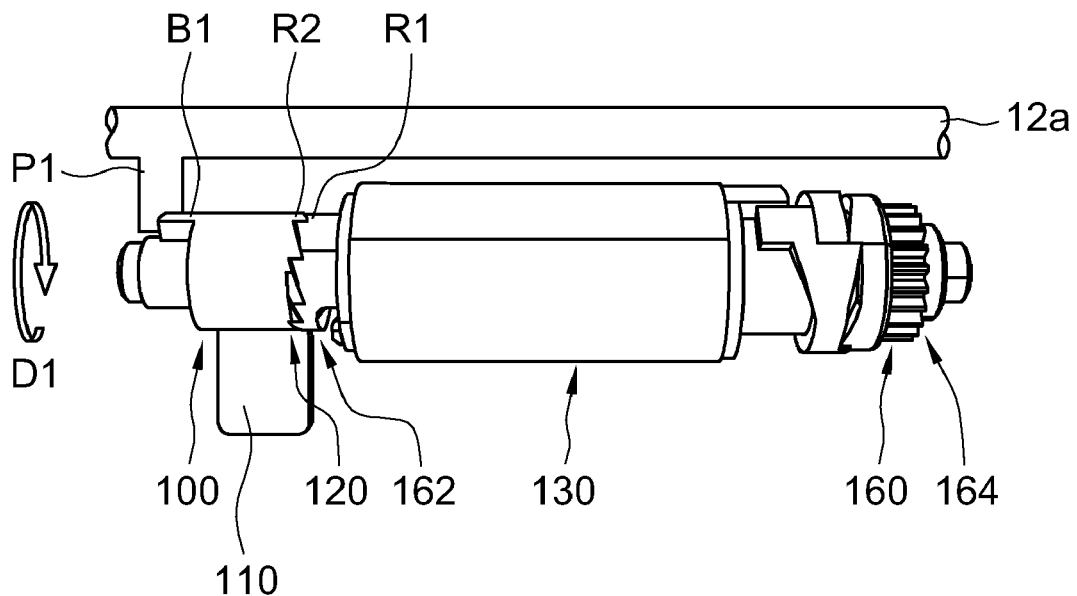
FIG. 3A shows the paper feeder and upper cover of FIG. 2A and FIG. 2B being in blocking state.
Figure 3B:
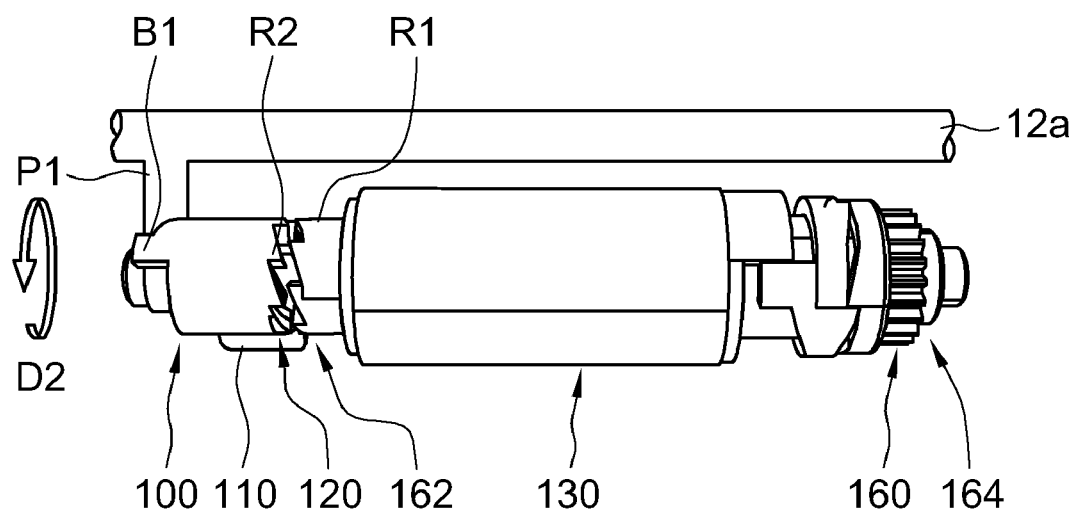
FIG. 3B shows the paper feeder and upper cover of FIG. 2A and FIG. 2B being in feeding state.
Figure 4A:
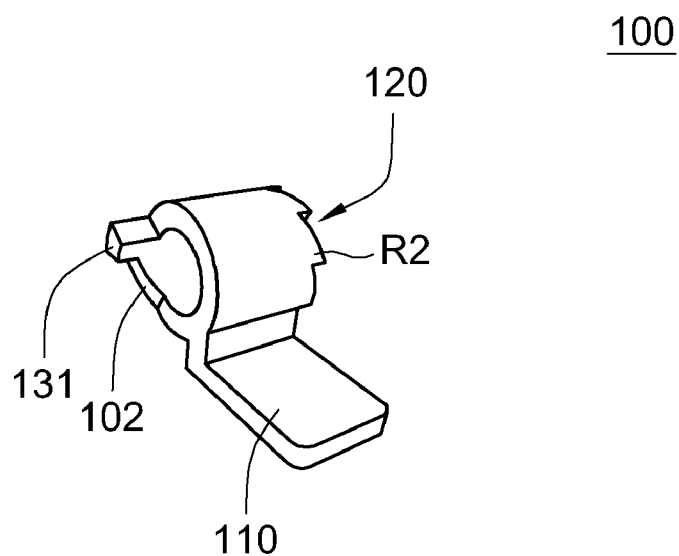
FIG. 4A shows a three-dimensional view of the paper stopper.
Figure 4B:
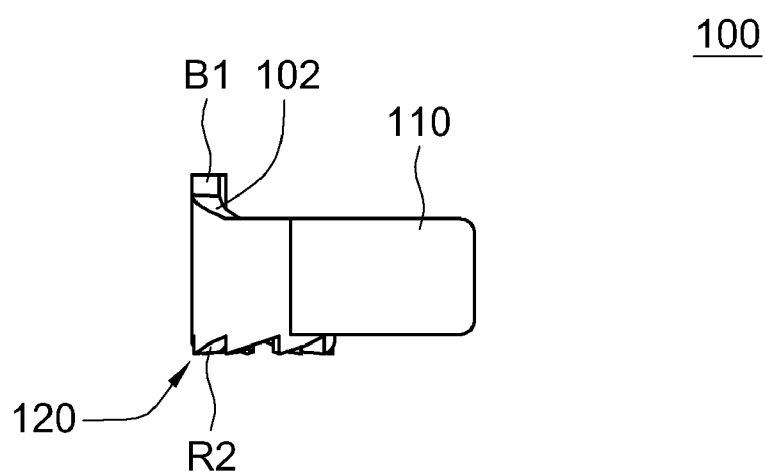
FIG. 4B shows a side view of the paper stopper.

Referring to both FIG. 3A and FIG. 3B, the paper feeder and upper cover of FIG. 2A and FIG. 2B being in blocking state and in feeding state are respectively shown. Also referring to both FIG. 4A and FIG. 4B, a three-dimensional view and a side view of the paper stopper are respectively shown. The paper stopper 100 includes a blocking plate 110 and an engaging portion 120, wherein the paper stopper 100 is co-axially and rotatably disposed on the feeding axle 160.

As shown in FIG. 3A, when the driving device 14 of FIG. 1 drives the feeding axle 160 to rotate in a direction D1, the engaging portion 162 is engaged with the engaging portion 120. The feeding axle 160 drives the paper stopper 100 to rotate in the direction D1 until the blocking plate 110 blocks the entrance of the paper or the document.

As shown in FIG. 3B, when the driving device 14 drives the feeding axle 160 to rotate in a direction D2, the engaging portion 162 is detached from the engaging portion 120, so that the feeding axle 160 is able to feed a paper or a document.

Preferably, the paper stopper 100 has a spiral surface 102 as shown in FIG. 2B. As shown in FIG. 3A, the upper cover 12a has a protrusion P1. When the driving device 14 of FIG. 1 drives the feeding axle 160 to rotate in the direction D1, and the protrusion P1 pushes the paper stopper 100 along the spiral surface 102 so that the engaging portion 120 is moved towards the engaging portion 162. The paper stopper 100 further has a limiting stopper B1 for limiting the rotation range of the paper stopper 100. When the feeding axle 160 rotates in the direction D1 and makes the protrusion P1 come into contact with the limiting stopper B1, the paper stopper 100 stops rotating. Preferably, the stroke of rotation for the protrusion P1 to contact the limiting stopper B1 is calculated, and the rotation range of the feeding axle 160 is controlled by firmware or software.

As shown in FIG. 3A and FIG. 3B, the engaging portion 162 and the engaging portion 120 preferably include a ratchet R1 and a ratchet R2 opposite to each other. That is, the engaging portion 162 is a ratchet portion for coupling with the engaging portion 120 located at one end of the feeding axle 160. When the engaging portion 162 and the engaging portion 120 are combined, the ratchet R1 is engaged with the ratchet R2. When the feeding axle 160 rotates in the direction D2, the engaging portion 120 drives the engaging portion 162 to lift the blocking plate 110.

As shown in FIG. 2A, FIG. 2B, FIG. 3A and FIG. 3B, a feed roller 130 is mounted on the feeding axle 160 and located between the transmission portion 164 and the engaging portion 162. As shown in FIG. 2B, the feeding axle 160 preferably further has a hook H1 for limiting the position of the feed roller 130 on the feeding axle 160. Preferably, the outer layer of the feed roller 130 is a rubber layer for convenience of driving paper or document.

As shown in FIG. 2A, a clutch element 140 is mounted on the feeding axle 160 and located between the feed roller 130 and the transmission portion 164. The feed roller 130 has a delay mechanism 132, and the clutch element 140 has a delay mechanism 142. When the feeding axle 160 rotates in the direction D2, the feeding axle 160 will spin idly for a stroke, and not until the delay mechanism 132 is coupled with the delay mechanism 142 will the feed roller 130 be driven and the rotation speed of the feed roller 130 become smooth. Preferably, the clutch element 140 further has a range difference S1 for limiting the position of the feed roller 130 on the feeding axle 160.

Likewise, as shown in FIG. 2A, the feeding axle 160 further includes a ratchet R3, and the clutch element 140 further includes a ratchet R4. When the feeding axle 160 rotates in the direction D1, the ratchet R3 and the ratchet R4 are engaged to drive the clutch element 140, the feed roller 130 and the paper stopper 100 to rotate in the direction D1. When the feeding axle 160 rotates in the direction D2, the ratchet R3 is detached from the ratchet R4.

According to the paper feeder having a paper stopper and the office machine using the same disclosed in the above embodiments of the invention, the paper stopper and the feeding axle are co-axially and rotatably disposed so that the paper stopper rotates in accordance with the feeding axle. In the blocking state, during the rotation of the feeding axle, the interference between the spiral surface of the paper stopper and the upper cover enables the paper stopper to shift horizontally and couple with the feeding axle. Meanwhile, the blocking plate is rotated to block the entrance of the document or the paper to avoid misfeed. In the feeding state, when the feeding axle rotates in the reverse direction, the paper stopper is detached from the feeding axle, and preferably the blocking plate of the paper stopper is lifted so that the office machine is able to feed a document or a paper again.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A paper feeder disposed on a casing for feeding a paper, the paper feeder comprising:
    a feeding axle having a first engaging portion; and
    a paper stopper comprising a blocking plate and a second engaging portion, the paper stopper co-axially and rotatably disposed on the feeding axle;
    wherein, when the feeding axle rotates in a first direction, the first engaging portion engages the second engaging portion and the feeding axle drives the paper stopper to rotate in the first direction until the blocking plate blocks the paper;
    when the feeding axle rotates in a second direction, the first engaging portion detaches from the second engaging portion and the feeding axle feeds the paper.

2. The paper feeder according to claim 1, wherein the paper stopper has a spiral surface, the casing comprises an upper cover having a protrusion, when the feeding axle rotates in the first direction, the protrusion pushes the paper stopper along the spiral surface so that the second engaging portion is moved towards the first engaging portion.

3. The paper feeder according to claim 2, the paper stopper further comprising a limiting stopper for limiting a rotation range of the paper stopper, when the feeding axle rotating in the first direction and the protrusion contacted the limiting stopper, the paper stopper stopped rotating.

4. The paper feeder according to claim 1, wherein the first engaging portion comprises a first ratchet and the second engaging portion comprises a second ratchet opposite to the first ratchet, when the first engaging portion and the second engaging portion are combined, the first ratchet is engaged with the second ratchet.

5. The paper feeder according to claim 4, wherein when the feeding axle rotates in the second direction, the first engaging portion drives the second engaging portion to lift the blocking plate.

6. An office machine for processing a paper, the office machine comprising:
a casing comprising an upper cover;
a driving device;
a paper feeder disposed on the casing, the paper feeder comprising:
a feeding axle having a first engaging portion and a transmission portion, wherein the transmission portion is coupled with the driving device; and
a paper stopper comprising a blocking plate and a second engaging portion, the paper stopper co-axially and rotatably disposed on the feeding axle;
wherein, when the driving device drives the feeding axle to rotate in a first direction, the first engaging portion engages the second engaging portion and the feeding axle drives the paper stopper to rotate in the first direction until the blocking plate blocks the paper;
when the driving device drives the feeding axle to rotate in a second direction, the first engaging portion detaches from the second engaging portion and the feeding axle feeds the paper.

7. The office machine according to claim 6, wherein the paper stopper has a spiral surface, the upper cover has a protrusion, and when the driving device drives the feeding axle to rotate in the first direction, the protrusion pushes the paper stopper along the spiral surface so that the second engaging portion is moved towards the first engaging portion.

8. The office machine according to claim 7, wherein the paper stopper further has a limiting stopper for limiting a rotation range of the paper stopper, and when the feeding axle rotates in the first direction and the protrusion contacts the limiting stopper, the paper stopper stops rotating.

9. The office machine according to claim 6, wherein the first engaging portion comprises a first ratchet and the second engaging portion comprises a second ratchet opposite to the first ratchet, when the first engaging portion and the second engaging portion are combined, the first ratchet is engaged with the second ratchet.

10. The office machine according to claim 9, wherein when the driving device drives the feeding axle to rotate in the second direction, the first ratchet drives the second ratchet to lift the blocking plate.

11. The office machine according to claim 6, further comprising a feed roller mounted on the feeding axle and located between the transmission portion and the first engaging portion.

12. The office machine according to claim 11, wherein the feeding axle further has a hook for limiting the position of the feed roller on the feeding axle.

13. The office machine according to claim 11, wherein the outer layer of the feed roller is a rubber layer.

14. The office machine according to claim 11, further comprising a clutch element mounted on the feeding axle and located between the feed roller and the transmission portion, wherein the feed roller has a first delay mechanism, the clutch element has a second delay mechanism, and when the feeding axle rotates in the first direction, the feed roller is not driven until the first delay mechanism is coupled with the second delay mechanism.

15. The office machine according to claim 14, wherein the feeding axle further comprises a first ratchet, and the clutch element further comprises a second ratchet;
wherein, when the feeding axle rotates in the first direction, the first ratchet is engaged with the second ratchet and drives the clutch element, the feed roller and the paper stopper to rotate in the first direction;
when the feeding axle rotates in the first direction, the first ratchet is detached from the second ratchet.

16. The office machine according to claim 14, the clutch element further comprising a range difference for limiting the position of the feed roller on the feeding axle.

17. The office machine according to claim 13, wherein the driving device is coupled with the transmission portion through a gear set or a transmission belt.

18. A paper stopper disposed on a paper feeder used in an office machine, the paper feeder having a feeding axle and the paper feeder feeding a paper, the paper stopper comprising:
a body co-axially and rotatably disposed on the feeding axle;
a blocking plate protruded from the body; and
a ratchet portion located at one end of the body for engaging with one end of the feeding axle;
wherein, when the feeding axle rotates in a first direction to engage the ratchet portion with the end of the feeding axle, the feeding axle drives the paper stopper to rotate in the first direction until the blocking plate blocks the paper;
when the feeding axle rotates in a second direction to detach the ratchet portion from the end of the feeding axle, the feeding axle is able to feed the paper.

19. The paper stopper according to claim 18, wherein the paper stopper has a spiral surface, an upper cover of the office machine has a protrusion, and when the feeding axle rotates in the first direction, the protrusion pushes the paper stopper along the spiral surface so that the ratchet portion is moved towards the end of the feeding axle.

20. The paper stopper according to claim 19, wherein the paper stopper further has a limiting stopper for limiting a rotation range of the paper stopper, and when the feeding axle rotates in the first direction and the protrusion contacts the limiting stopper, the paper stopper stops rotating.

* * * * *